(No Model)

P. H. REARDON.
CORN HOLDER.

No. 586,058. Patented July 6, 1897.

Witnesses

Patrick H. Reardon, Inventor

By Schreiter & Van Iderstine
his Attorneys.

UNITED STATES PATENT OFFICE.

PATRICK H. REARDON, OF YONKERS, NEW YORK.

CORN-HOLDER.

SPECIFICATION forming part of Letters Patent No. 586,058, dated July 6, 1897.

Application filed June 13, 1896. Serial No. 595,472. (No model.)

*To all whom it may concern:*

Be it known that I, PATRICK H. REARDON, a citizen of the United States, and a resident of Yonkers, county of Westchester, and State of New York, have invented certain new and useful Improvements in Corn-Holders, the following being a clear, full, and exact specification of this invention, reference being had to the accompanying drawings, wherein—

Figure 1:
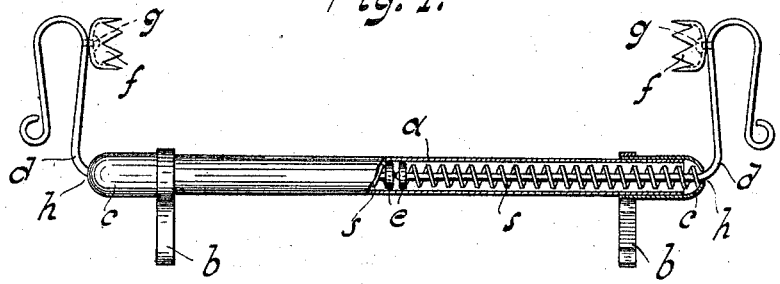
Figure 2:
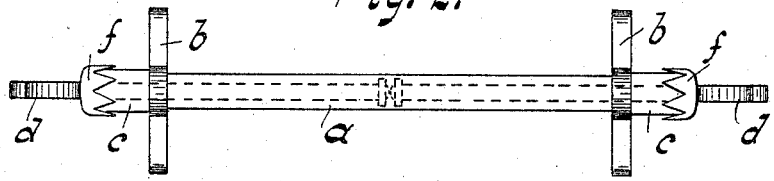
Figure 3:
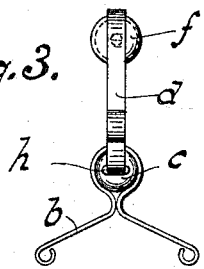
Figure 4:
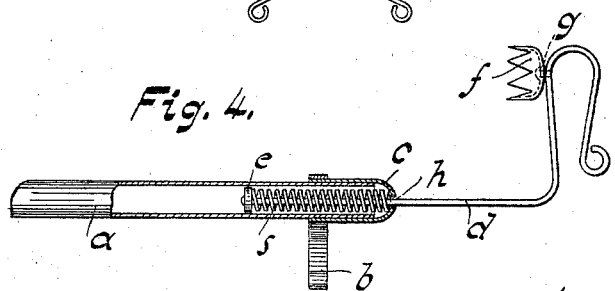

Figure 1 is an elevation of my improved corn-holder, a part being shown in section to disclose the mechanism arranged within the tubular casing. Fig. 2 is a top view; Fig. 3, an end view of the corn-holder. Fig. 4 is an elevation, partly a section, showing the relative position of the parts of the corn-holder when the arms are extended.

My invention relates to culinary utensils; and it consists of a holder for ears of corn adapted for use on a dining-table and also as means of holding the corn-ear while the same is eaten.

My improved corn-holder is illustrated in the accompanying drawings, and consists of a tubular casing, lengthwise extensible arms journaled therein, chucks with prongs turnably secured to the arms, spiral springs holding the arms together, and suitable standards for sustaining the holder in upright position on the table.

The tubular casing, wherein the stems of the arms $d$ slide, is produced preferably of metal or of some metallic alloy in three parts, the tube $a$ and the caps $c$ and $c'$, closing its ends.

Arms $d$ are produced of a flat strip of metal of suitable dimensions. Their shape (shown in the drawings) may be varied and ornamental handles added thereto. Their stems, bent at right angles to the arms, are inserted in the tubular casing $a$. They slide through corresponding apertures $h$, provided in the terminal ends of the caps $c$, and plugs $e$, secured on their ends, sustain the stems centrally within the tubular casing $a$.

The shape of the apertures $h$ is shown in Fig. 3 of the drawings. It is necessary to make the stems of arms $d$ flat and the apertures $h$ shaped correspondingly to prevent their turning and to sustain arms $d$ in upright position. This could also be accomplished by making the tubular casing square or polygonal and conforming the plugs set on the ends of the stems of arms $d$ to this shape. This would, however, not be found as well answering the purpose as the construction described above.

Spiral springs $s$ are slid on the stems of arms $d$ between the washers $e$ and the ends of the casing. These spiral springs hold the stems of arms $d$ drawn together inside the casing $a$. They resist the extension of arms $d$ and press the prongs of chucks $f$, rotatably secured thereto on rings or rivets $g$, into an ear of corn set between them. Chucks $f$ are metallic disks having serrated edges bent forward, as shown in the drawings, and are secured rotatably to arms $d$ by means of screws or rivets $g$.

Standards $b$, set one on each end of casing $a$, preferably around the edges of the caps $c$, as shown in the drawings, are made of flat bars, preferably of the same material as the arms $d$, and they sustain the holder on a table or plate, with arms $d$ extending upward. The shape of these standards (shown in Fig. 3) may be varied and ornaments added thereto, and they may also be cast in one piece with the cap $c$.

The construction of my improved corn-holder may also be modified by making only one arm extensible through one part or through the whole length of casing $a$, the other being rigidly secured to the other end of the casing. Solitary pins or spurs could be substituted for one or both chucks $f$, and also one-half of the corn-holder could be produced as a casting, all parts in one piece, and the other one with an extensible arm screwed thereto.

I claim as my invention and desire to secure by Letters Patent—

1. A lengthwise-extensible corn-holder, comprising a tubular casing closed on both ends with caps, having rectangular apertures, arms having flat stems bent at right angles, inserted in the tubular casing through the apertures in the caps, spiral springs, slid on the stems and held thereon by plugs secured to the ends of the stems, chucks having oppositely-projecting prongs, rotatably secured to the arms, and standards secured to the casing, and sustaining the holder in position with arms extending upward.

2. In a corn-holder, the combination with two arms, having chucks with oppositely-projecting prongs rotatably secured thereto, flat stems bent at right angles, and springs slid on the stems of the arms and secured to the ends thereof, of a tubular casing closed on both ends with caps, having rectangular apertures, and standards secured thereto sustaining the holder in position with arms extending upward.

3. In a corn-holder, the combination with arms having flat stems adapted to slide in a tubular casing closed on both ends with caps, having rectangular apertures and provided with standards sustaining the holder in position with the arms extending upward, of chucks having oppositely-projecting prongs rotatably secured to the arms in position oppositely each other.

In witness that I claim the improvements described in the foregoing specification I have signed my name in the presence of two subscribing witnesses.

PATRICK H. REARDON.

Witnesses:
RICHARD I. ELLIOTT,
A. W. KURZ.